(12) United States Patent
DiBenedetto et al.

(10) Patent No.: US 8,210,316 B2
(45) Date of Patent: Jul. 3, 2012

(54) OIL SCAVENGE SYSTEM FOR A GAS TURBINE ENGINE

(75) Inventors: Enzo DiBenedetto, Torrington, CT (US); Todd A. Davis, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1118 days.

(21) Appl. No.: 11/609,428

(22) Filed: Dec. 12, 2006

(65) Prior Publication Data

US 2008/0134657 A1 Jun. 12, 2008

(51) Int. Cl.
*F01D 25/20* (2006.01)
*F02C 7/06* (2006.01)

(52) U.S. Cl. ........ 184/6.11; 184/6.2; 384/473; 60/39.08

(58) Field of Classification Search ............ 184/6.2, 184/6.11, 6.12, 6.13; 60/39.08; 384/93, 384/322, 462, 466, 467, 473; 415/169.1, 415/169.2
See application file for complete search history.

(56) References Cited

U.S. PATENT DOCUMENTS

| | | | |
|---|---|---|---|
| 2,604,188 A | 7/1952 | Edgar | |
| 2,609,065 A | 9/1952 | Douglas | |
| 4,422,821 A * | 12/1983 | Smith | 415/89 |
| 4,502,274 A * | 3/1985 | Girault | 60/39.08 |
| 4,531,358 A | 7/1985 | Smith | |
| 4,631,009 A * | 12/1986 | Cygnor et al. | 418/15 |
| 5,722,778 A * | 3/1998 | Kishikawa et al. | 384/471 |
| 6,438,938 B1 * | 8/2002 | Burkholder et al. | 60/39.08 |
| 6,516,618 B1 * | 2/2003 | Bock | 60/782 |
| 6,568,970 B2 * | 5/2003 | Berthiaume et al. | 440/88 A |
| 6,996,968 B2 * | 2/2006 | Peters et al. | 60/39.08 |
| 7,118,336 B2 * | 10/2006 | Waddleton | 416/1 |
| 7,699,530 B2 * | 4/2010 | Blais | 384/462 |
| 7,878,303 B2 * | 2/2011 | Munson | 184/6.11 |
| 2003/0037992 A1 * | 2/2003 | Hur | 184/6.2 |
| 2004/0089483 A1 * | 5/2004 | Viaud et al. | 177/136 |
| 2005/0132710 A1 * | 6/2005 | Peters et al. | 60/772 |
| 2005/0141793 A1 * | 6/2005 | Delano | 384/322 |
| 2005/0166570 A1 * | 8/2005 | Granitz et al. | 60/39.08 |
| 2005/0217272 A1 * | 10/2005 | Sheridan et al. | 60/772 |
| 2006/0249332 A1 * | 11/2006 | Bruce | 184/6.11 |
| 2007/0028590 A1 * | 2/2007 | Bart et al. | 60/39.08 |
| 2008/0127627 A1 * | 6/2008 | Jewess et al. | 60/39.08 |

FOREIGN PATENT DOCUMENTS

GB 2043799 10/1980

OTHER PUBLICATIONS

Extended European Search Report, dated Apr. 8, 2011, EP Application No. 07254617.9.

* cited by examiner

*Primary Examiner* — Bradley King
*Assistant Examiner* — Thomas Irvin
(74) *Attorney, Agent, or Firm* — Carlson Gaskey & Olds P.C.

(57) ABSTRACT

An oil scavenge system includes a scavenge pipe which extends forward into a relatively long and narrow compartment area of a rear bearing compartment of a gas turbine engine with aggressive core size constraints. The scavenger pipe communicates collected oil to a scavenger pump to return oil to the oil sump and evacuate the oil before flooding of the seals may occur.

23 Claims, 8 Drawing Sheets

OIL SCAVENGE SYSTEM FOR A GAS TURBINE ENGINE

BACKGROUND OF THE INVENTION

The present invention relates to a system for gas turbine engines, and more particularly to an oil scavenge system therefore.

Gas turbine engines employ high-speed bearings that require a continuous supply of oil for lubrication and cooling. For optimum performance, the oil flow must be properly directed to and from the bearings. Failure to remove or scavenge oil from the bearing may be as detrimental to the bearing as insufficient oil flow because the churning of unscavenged oil within the bearing may also lead to overheating.

In a conventional lubrication system, oil is supplied to the rolling elements of the bearings under pressure. Then gravity, compartment pressurization or its dynamics is relied upon to drain back to a sump. One effective way to accomplish the return flow is to maintain an open, conical, and unrestricted passageway from the bearing back to the sump.

An engine that uses a high speed turbine, such as a geared turbofan engine, requires a relatively large disk bore for structural integrity. A sealed bearing compartment separates oil from the hot external environment air which is in close proximity to a heated turbine disk bore. As engine core size constraints become more aggressive and speeds increase, disadvantages of conventional scavenger systems may occur. If, for example, the engine length is reduced, the bearing compartment may be closely fitted inside the disk bore. In particular, as the size of the sump region decreases, the distance between the compartment seals and the free surface of collected oil decreases. This often results in a long and narrow bearing compartment.

During level attitude operation, the oil is supplied to the bearing, then collects at the bottom and rear of the bearing compartment where the oil is scavenged by a pump for filtration and re-use. During nose down attitudes, however, such as those required for aircraft descent, a long and narrow bearing compartment shape may create a dam that will prevent oil in the front of the compartment from being effectively scavenged such that adjacent seals may become flooded (FIG. 7). Compartment seals may leak under such a flooded condition and the oil may over time eventually pool in the hot external environment and may become problematic.

Accordingly, it is desirable to provide an oil scavenge system for a long and narrow bearing compartment shape to minimize or prevent oil leakage during all operating conditions.

SUMMARY OF THE INVENTION

The oil scavenge system according to the present invention includes a scavenge pipe which extends into a relatively long and narrow compartment area of a bearing compartment typical of a gas turbine engine with aggressive core size constraints. The scavenger pipe includes an inlet which receives the bearing compartment two-phase air/oil mixture from a circumferential path and redirects the oil into the scavenger pipe.

The scavenger pipe communicates collected oil with a scavenger pump and returns the oil to an oil sump such that oil is evacuated from the seals.

The present invention therefore provides an oil scavenge system for a long and narrow bearing compartment shape without oil leakage during all operating conditions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
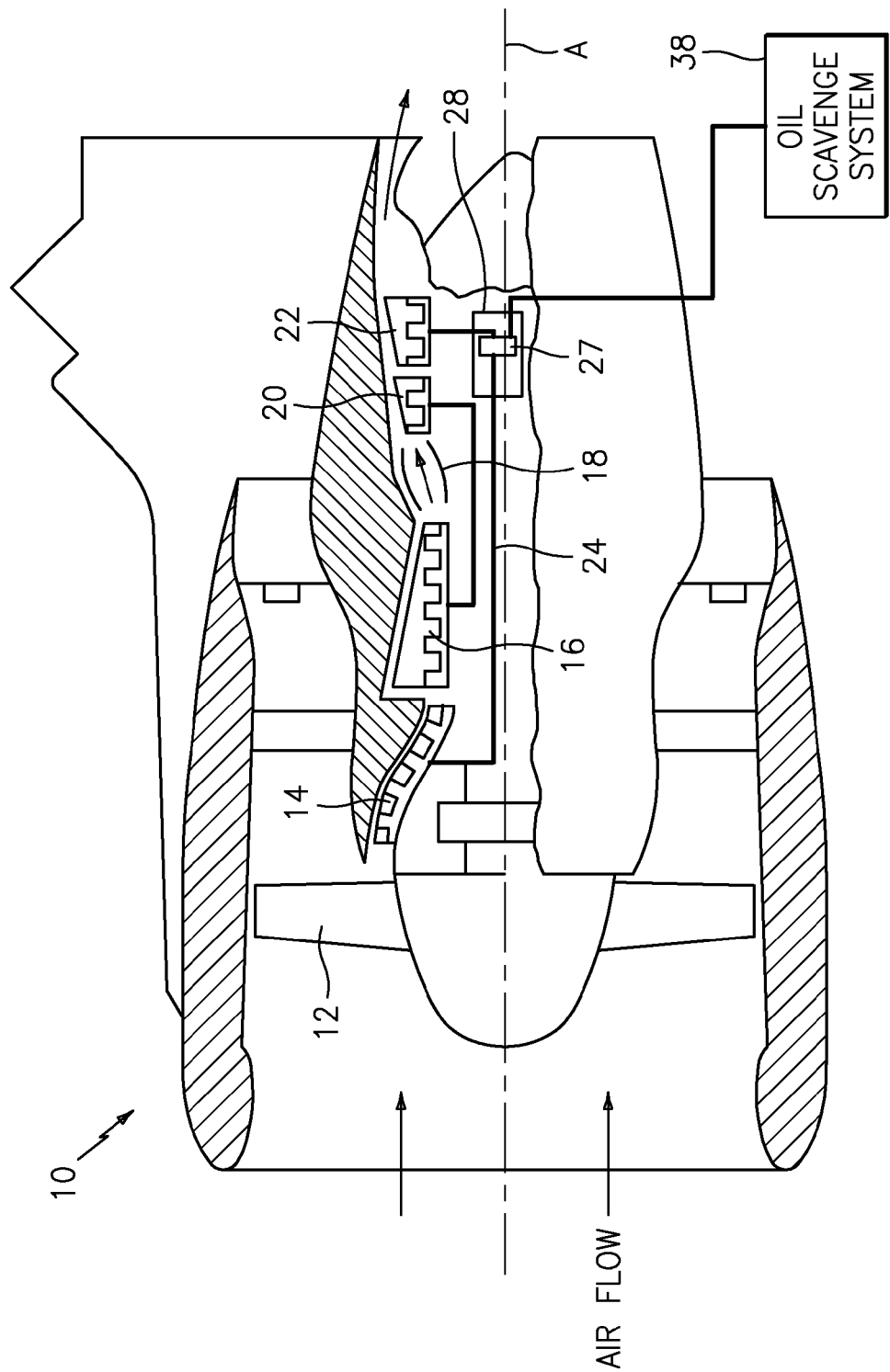
FIG. 1 is a general schematic sectional view of an exemplary gas turbine engine embodiment for use with the present invention.

FIG. 1 illustrates a general schematic sectional view of a gas turbine engine 10. The gas turbine engine 10 is defined about an engine centerline A about which the various engine sections rotate. Generally, the engine 10 includes a fan section 12, a low pressure compressor section 14, a high pressure compressor section 16, a combustor section 18, a high pressure turbine section 20 and a low pressure turbine section 22. It should be understood that although a particular arrangement is disclosed in the illustrated embodiment, other arrangements will benefit from the present invention.

The sections are mounted about a respective shaft for a high pressure spool and a low pressure spool supported by various high speed bearings. One bearing 27 is located within a rear bearing compartment 28 to support the low pressure shaft (LPT) 24. The bearing 27 and the compartment 28 receive lubrication and cooling from oil which is provided through jets and is then collected through an oil scavenge system 38 which returns the oil through a scavenge flow path S to a primary scavenge pump P1 (illustrated schematically). It should be understood that various bearing systems and scavenge flow paths will benefit from the present invention.

Figure 2:
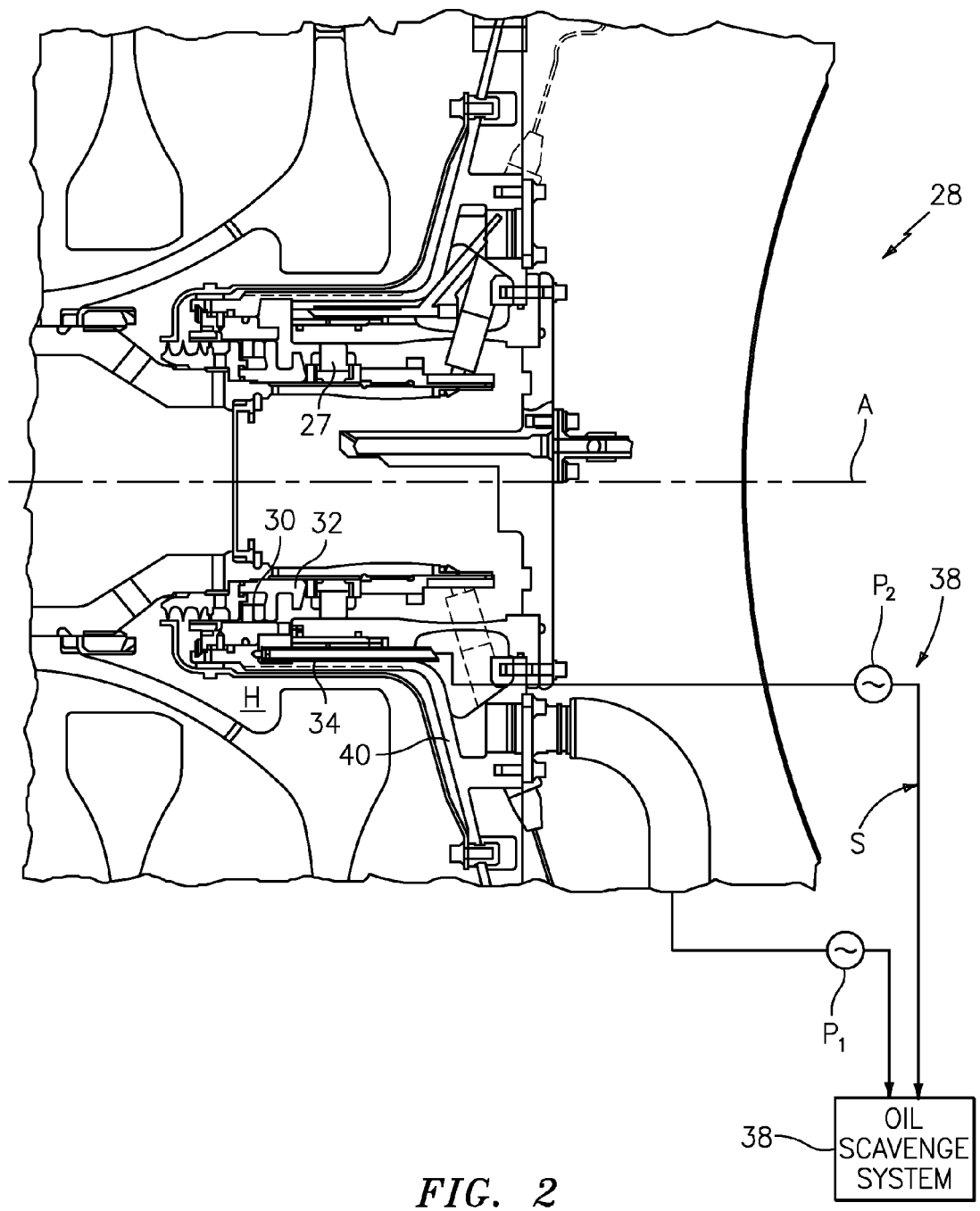
FIG. 2 is an expanded general schematic sectional view of a rear bearing compartment illustrated in FIG. 1.
Figure 3:
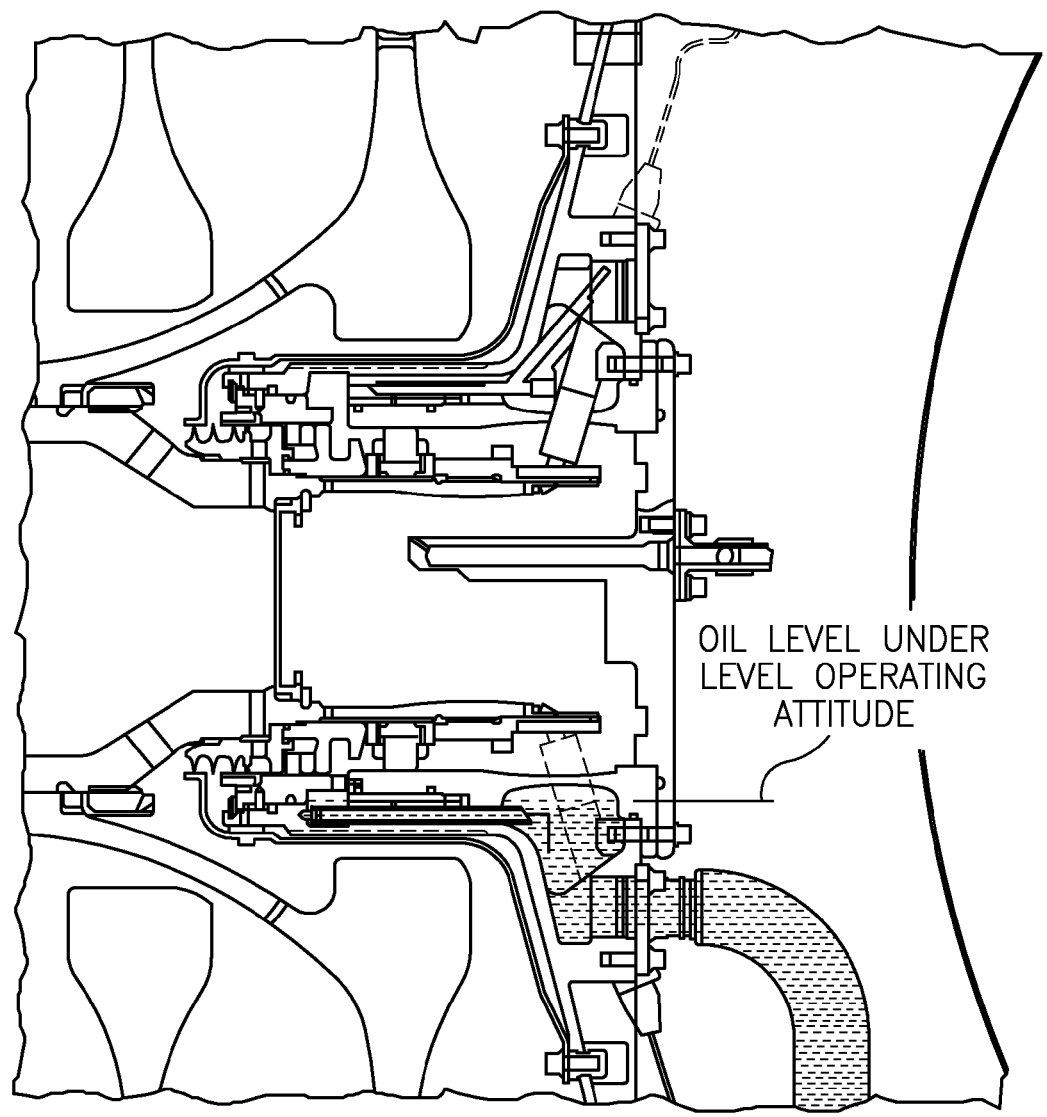
FIG. 3 is an expanded general schematic sectional view of the rear bearing compartment showing an oil level during a level operating attitude.

Referring to FIG. 2, the rear bearing compartment 28 seals 30, 32 prevent oil leakage from a forward relatively long and narrow compartment area 34 during normal operating conditions (FIG. 3). It should be understood that various seals including brush and carbon ring seals may be utilized with the present invention. It should be understood that the relatively long and narrow compartment area 34 is shown in a longitudinal cross-section but is actually an annular compartment area typical of various engine types and locations. The section shown includes a bottom dead center (BDC) location within which the present invention is preferably located.

To achieve compartment functionality, i.e. low temperatures and low heat generation without risk of oil leakage into a hot external environment H, air and oil flows are cycled to the oil scavenge system 38. It should be understood that various conventional oil injection jets and breather systems may be utilized with the present invention.

The oil scavenge system 38 is at least partially located within a housing 40 which forms a portion of the rear bearing compartment 28. It should be understood that although a generally cylindrical housing is disclosed in the illustrated embodiment, various housing configurations which utilize oil scavenge systems will benefit from the present invention.

Figure 4A:
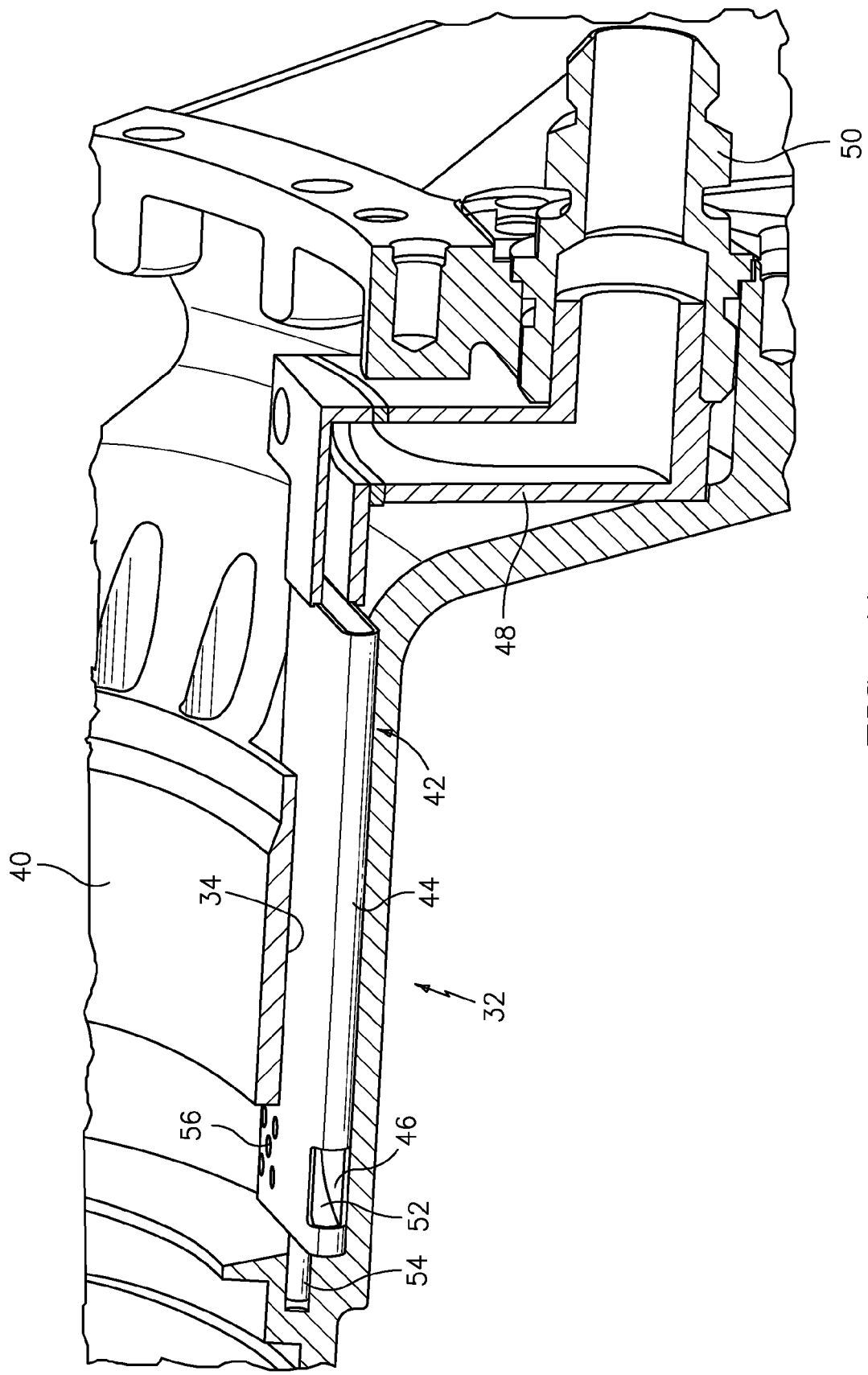
FIG. 4A is an expanded perspective partial sectional view of a scavenger pipe assembly.

Referring to FIG. 4A, the oil scavenge system 38 generally includes a scavenger pipe assembly 42 which extends into the long and narrow compartment area 34 to scavenge oil therefrom. The scavenger pipe assembly 42 is preferably remote and radially inboard of the main sump compartment area (FIG. 3).

Figure 5:
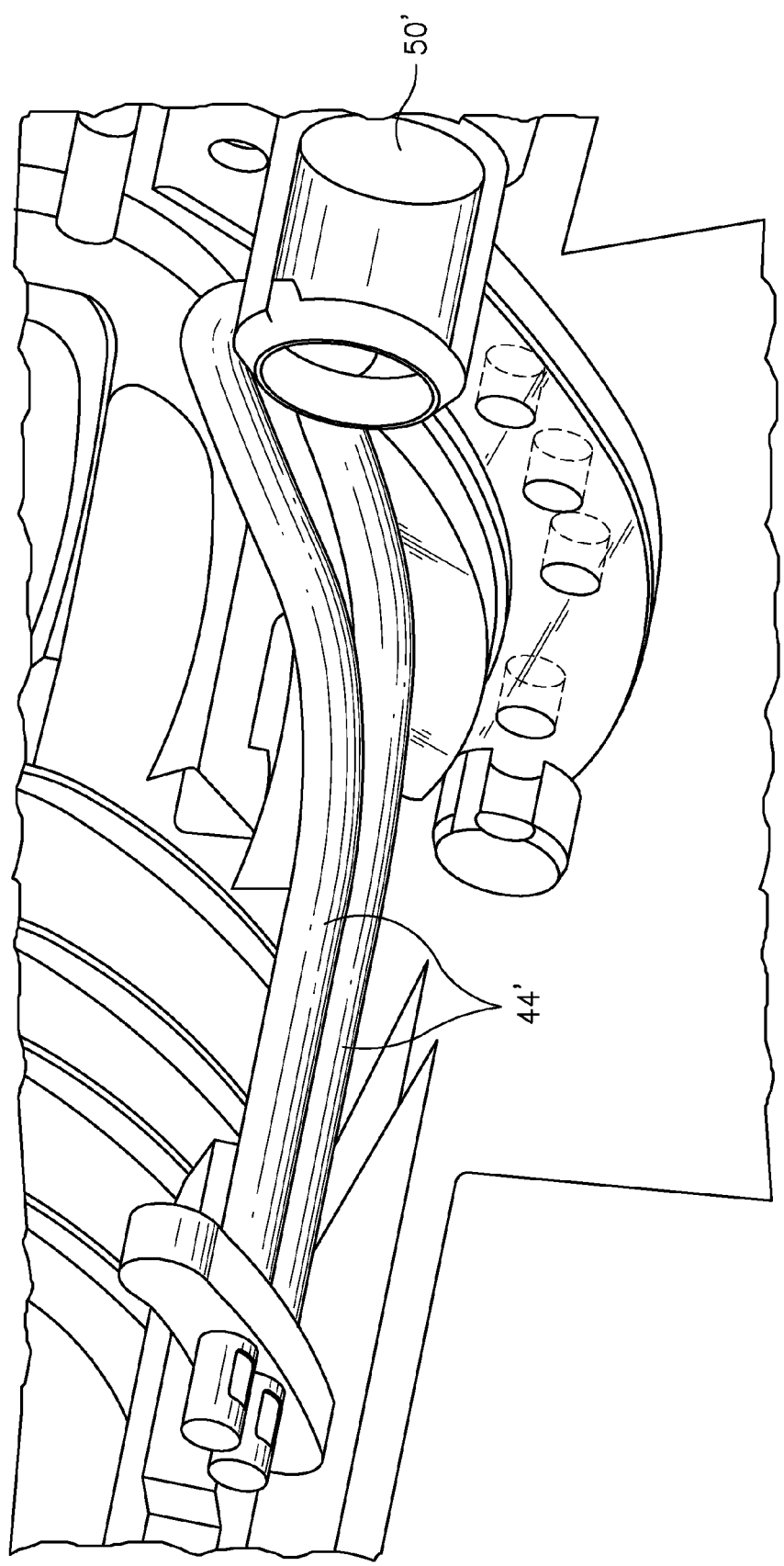
FIG. 5 is an expanded perspective partial sectional view of another type of scavenger pipe assembly.

The scavenger pipe assembly 42 generally includes a scavenger pipe 44 having an inlet 46 at one end section thereof and a connector 48 and a fitting 50 at the opposite end section, thereof. The scavenger pipe 44 is preferably non-circular in cross-section to fit within the long and narrow compartment area 34. Most preferably, the scavenger pipe 44 is generally race-track shaped in cross-section. It should be understood that various shaped scavenger pipes as well as multiple pipe arrangements 44' which communicate with a single fitting 50' (FIG. 5) may alternatively or additionally be utilized with the present invention.

Figure 4B:
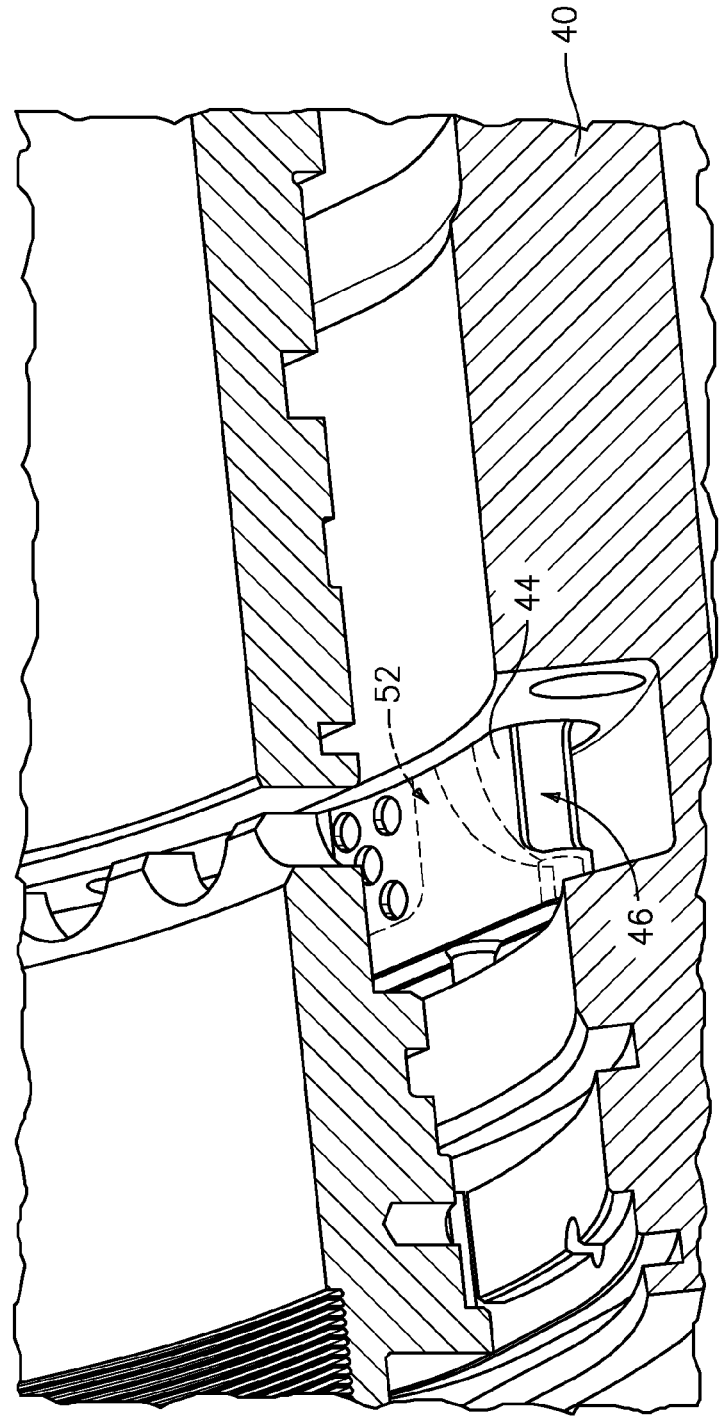
FIG. 4B is a top expanded perspective partial sectional view of the scavenger pipe assembly.

The inlet 46 of the scavenger pipe 44 is preferably located at bottom dead center (BDC) or within several degrees of BDC with respect to an engine rotation (FIG. 4B) to receive a swirling bearing compartment air/oil mixture from a circumferential path direction. That is, the inlet is preferably circumferentially located through the sidewall of the scavenger pipe 44. The inlet 46 includes a turning vane 52 located therein to facilitate redirection of the swirling bearing compartment two-phase air/oil mixture from the circumferential engine rotation path direction to an axial direction into the scavenger pipe 44. The turning vane 52 includes a pin 54 which interfaces with the housing 40 to position and restrain the scavenger pipe 44 within the long and narrow compartment area 34. The scavenger pipe 44 further includes a multiple of drain holes 56 to receive collected oil into the scavenger pipe 44 from drainage from the downstream (opposite) side of the inlet 52.

Figure 6:
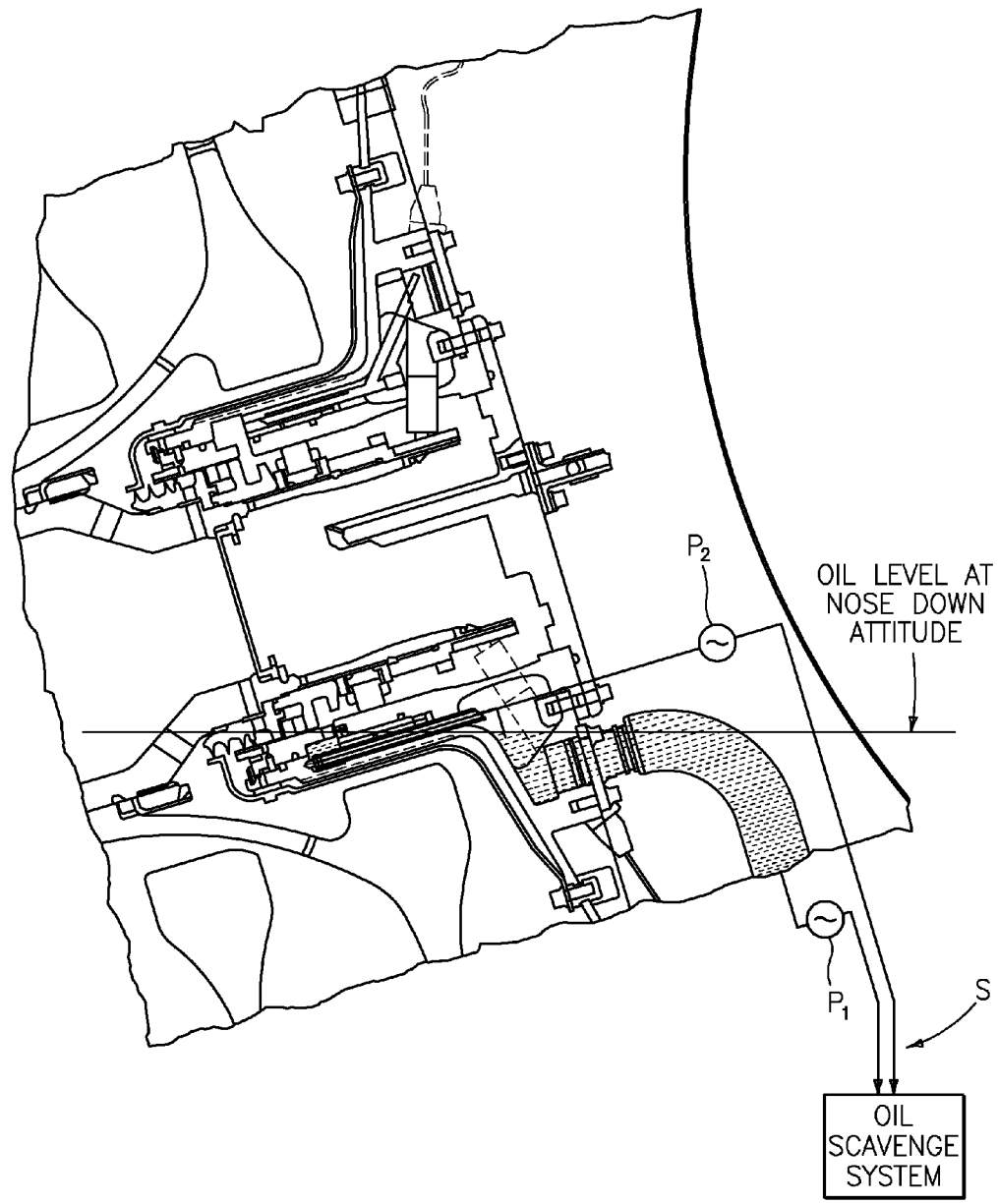
FIG. 6 is an expanded general schematic sectional view of the rear bearing compartment showing an oil level during a nose-down operating attitude.
Figure 7:
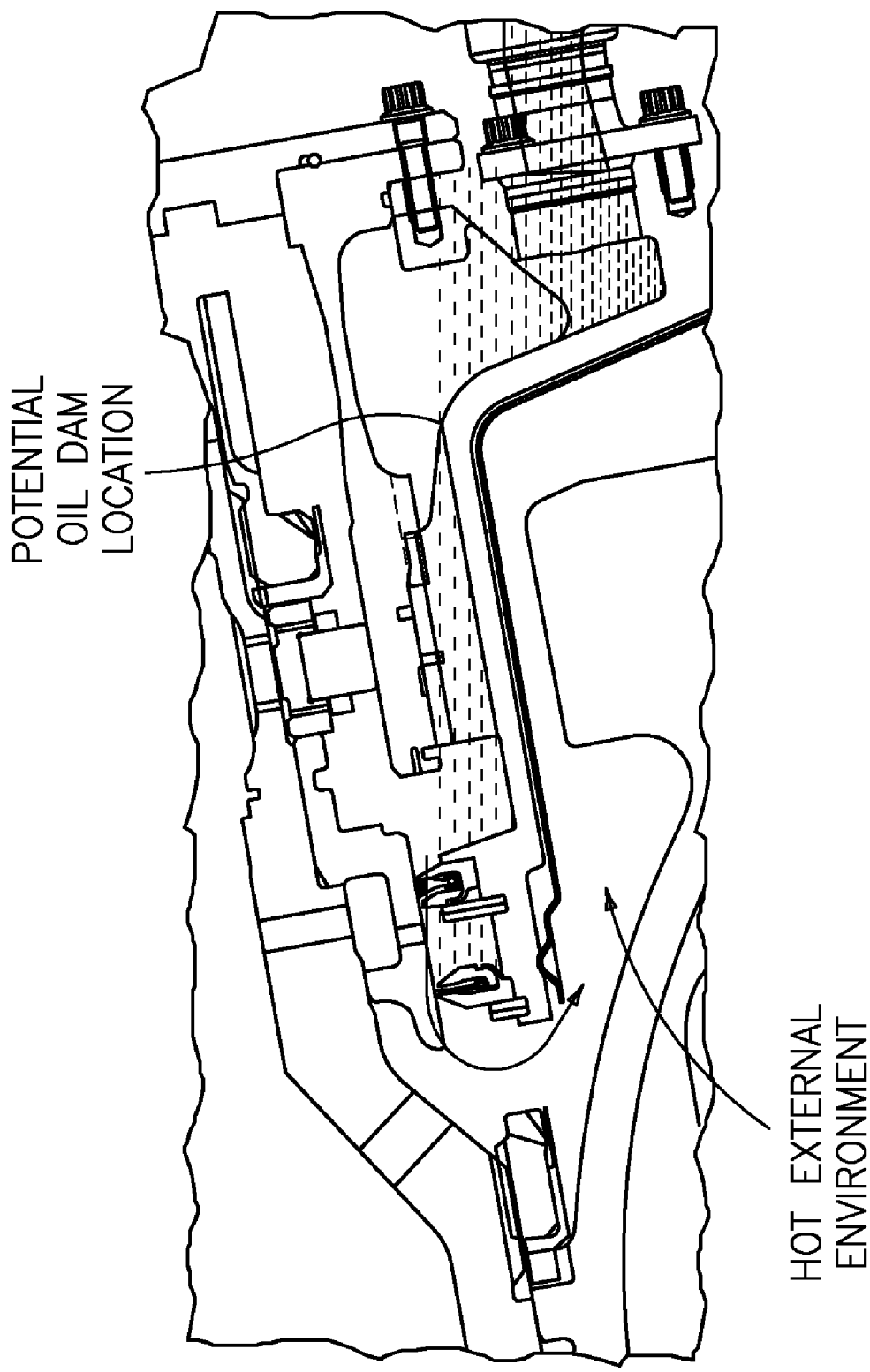
FIG. 7 is a PRIOR ART general schematic sectional view of a rear bearing compartment showing an oil level flooding and leakage condition.

The scavenger pipe 44 communicates through the connector 48 and into the fitting 50. The connector 48 is preferably generally L-shaped to facilitate scavenger pipe 44 installation. The scavenger pipe assembly 42 communicates collected oil to a secondary scavenger pump P2 separate from the primary scavenger pump P1 (FIG. 2). The secondary scavenger pump P2 returns scavenged oil to the sump such that the long and narrow compartment area 34 is evacuated irrespective of attitude to prevent flooding of the seals which may occur at particular attitudes (FIG. 6). The secondary scavenger pump P2 minimizes the potential for the formation of an air lock within the scavenger pipe 44. The oil scavenge system may contain either dedicated oil pumps or a dedicated pump stage for each return line to remove collected oil from the subject area. It should be understood that other pressures, gravity, compartment pressurization or its dynamics may alternatively or additionally be utilized.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An oil scavenge system for a gas turbine engine comprising:
   a bearing compartment having a first compartment area and a second compartment area, the first compartment being radially outboard of the second compartment area relative to an engine axis of rotation;
   a scavenger pipe having an inlet, said scavenger pipe extends into said second compartment area generally parallel to the engine axis of rotation, said scavenger pipe positioned radially inboard of said first compartment area;
   a fitting mounted to the scavenger pipe at a location generally opposite the inlet, the fitting being disposed in the first compartment area;
   a connector mounted between said scavenger pipe and said fitting to communicate fluid from the scavenger pipe to the fitting, said connector disposed in both said first and second compartment areas; and
   a scavenger pump in communication with said fitting.

2. The system as recited in claim 1, further comprising a second scavenger pump in communication with said scavenger pipe.

3. The system as recited in claim 1, wherein said inlet is a circumferential inlet located through a sidewall of said scavenger pipe configured to receive a swirling bearing compartment two-phase air/oil mixture from a circumferential engine rotation path direction, the circumferential engine rotation path direction generally transverse to the engine axis of rotation.

4. The system as recited in claim 3, wherein said scavenger pipe includes a turning vane located therein adjacent to said inlet, said turning vane configured to redirect the swirling bearing compartment two-phase air/oil mixture from the circumferential engine rotation path direction to an axial direction into the scavenger pipe generally parallel to the engine axis of rotation.

5. The system as recited in claim 1, wherein said scavenger pipe is remote from said first compartment area.

6. The system of claim 1, wherein said second compartment area is a long and narrow compartment area generally parallel to an engine axis.

7. The system as recited in claim 1, wherein said scavenger pipe is non-circular in cross-section, said scavenger pipe defines a multiple of openings through a radial inboard surface relative said axis of rotation.

8. The system as recited in claim 1, wherein the fitting is mounted to the scavenger pipe at a location generally opposite the inlet by way of a connector configured to communicate fluid between the scavenger pipe and the fitting.

9. The system as recited in claim 8, wherein the connector is L-shaped.

10. The system as recited in claim 1, wherein the scavenger pipe is located generally upstream relative to the fitting.

11. The system as recited in claim 1, wherein the second bearing compartment is axially longer than the first bearing compartment.

12. The assembly as recited in claim 1, wherein said connector is formed separately from said scavenger pipe and said fitting.

13. An oil scavenge system for a gas turbine engine comprising:
- a bearing compartment having a first compartment area and a second compartment area, the first compartment area disposed radially outboard of the second compartment area relative to an engine axis of rotation;
- a primary scavenger pump in fluid communication with said first compartment area;
- a scavenger pipe having an inlet, said scavenge pipe extends into said second compartment area generally parallel to the engine axis of rotation, said scavenger pipe positioned radially inboard of said first compartment area;
- a secondary scavenger pump in fluid communication with said scavenger pipe.

14. The system as recited in claim 13, wherein said bearing compartment is a rear bearing compartment of a gas turbine engine.

15. The system as recited in claim 13, wherein said scavenger pipe is located at bottom dead center of said second compartment area, said inlet is a circumferential inlet located through a sidewall of said scavenger pipe to receive a swirling bearing compartment two-phase air/oil mixture from a circumferential engine rotation path direction.

16. The system as recited in claim 13, wherein said second compartment area is a long and narrow compartment area generally parallel to said engine axis of rotation radially inboard of said first compartment area relative to an engine axis of rotation.

17. The system as recited in claim 13, wherein said scavenger pipe is one of a multiple of scavenger pipes in fluid communication with a fitting.

18. An oil scavenger pipe assembly for a gas turbine engine comprising:
- a bearing compartment including a first compartment area and a second compartment area, said first compartment area radially outboard of said second compartment area relative to an engine axis of rotation;
- a scavenger pipe having an inlet disposed in said second compartment area, said scavenger pipe extending in a direction generally parallel to an engine axis of rotation;
- a connector mountable to said scavenger pipe opposite said inlet, said connector being disposed at least partially in said first compartment area;
- a fitting mountable to said connector and axially offset from said scavenger pipe; and
- a turning vane mounted within said scavenger pipe adjacent said inlet, said turning vane redirecting fluid entering the inlet to flow downstream through the scavenger pipe in a direction generally parallel to said engine axis of rotation.

19. The assembly as recited in claim 18, wherein said scavenger pipe is non-circular in cross-section, said scavenger pipe defines a multiple of openings through a radial inboard surface relative said axis of rotation.

20. The assembly as recited in claim 18, wherein said turning vane includes a pin which extends therefrom to mount said scavenger pipe, said inlet is a circumferential inlet located through a sidewall of said scavenger pipe to receive a swirling bearing compartment two-phase air/oil mixture from a circumferential engine rotation path direction, the circumferential engine rotation path being generally transverse to said engine axis of rotation, said turning vane redirects the swirling bearing compartment two-phase air/oil mixture from the circumferential engine rotation path direction to an axial direction into the scavenger pipe, the axial direction being generally parallel to the engine axis of rotation.

21. The assembly as recited in claim 18, wherein the scavenger pipe, the connector, and the fitting are each configured to allow fluid to flow therethrough.

22. The assembly as recited in claim 21, wherein, when fluid enters the inlet, fluid enters the inlet in a direction generally transverse to the engine axis of rotation.

23. The assembly as recited in claim 22, wherein said turning vane causes fluid entering through the inlet to flow downstream through the scavenger pipe in a direction generally parallel to the engine axis of rotation.

* * * * *